United States Patent
Fang et al.

(10) Patent No.: US 11,416,979 B2
(45) Date of Patent: Aug. 16, 2022

(54) DEFECT DISPLAYING METHOD

(71) Applicant: ASML Netherlands B.V., AH Veldhoven (NL)

(72) Inventors: Wei Fang, Milpitas, CA (US); Cho Huak Teh, Los Altos, CA (US); Ju Hao Chien, New Taipei (TW); Yi-Ying Wang, Hsinchu (TW); Shih-Tsung Chen, Hsinchu (TW); Jian-Min Liao, Hsinchu (TW); Chuan Li, San Jose, CA (US); Zhaohui Guo, San Jose, CA (US); Pang-Hsuan Huang, Hsinchu (TW); Shao-Wei Lai, Hsinchu (TW); Shih-Tsung Hsu, Hsinchu (TW)

(73) Assignee: ASML Netherlands B.V., Veldhoven (NL)

( * ) Notice: Subject to any disclaimer, the term of this patent is extended or adjusted under 35 U.S.C. 154(b) by 125 days.

(21) Appl. No.: 16/479,190

(22) PCT Filed: Jan. 18, 2018

(86) PCT No.: PCT/EP2018/051171
§ 371 (c)(1),
(2) Date: Jul. 18, 2019

(87) PCT Pub. No.: WO2018/134290
PCT Pub. Date: Jul. 26, 2018

(65) Prior Publication Data
US 2019/0370950 A1 Dec. 5, 2019

Related U.S. Application Data
(60) Provisional application No. 62/616,407, filed on Jan. 11, 2018, provisional application No. 62/447,558, filed on Jan. 18, 2017.

(51) Int. Cl.
*G06T 7/00* (2017.01)

(52) U.S. Cl.
CPC .......... *G06T 7/001* (2013.01); *G06T 2200/24* (2013.01); *G06T 2207/20081* (2013.01); *G06T 2207/30148* (2013.01)

(58) Field of Classification Search
CPC ................. G06T 7/001; G06T 2200/24; G06T 2207/20081; G06T 2207/30148; G06T 2207/10061; G06T 11/00
See application file for complete search history.

(56) References Cited

U.S. PATENT DOCUMENTS 6,072,574 A * 6/2000 Zeimantz ........... G01N 21/9501
356/237.4
6,477,265 B1* 11/2002 Sheng ................... G06T 7/0002
250/491.1

(Continued)

FOREIGN PATENT DOCUMENTS

| CN | 1845305 A | 10/2006 |
|---|---|---|
| TW | 201411760 A | 3/2014 |
| WO | WO 2017/049219 A1 | 3/2017 |

OTHER PUBLICATIONS

Office Action and Search Report issued from the Intellectual Property Office of ROC Taiwan Patent Application No. 107101927, dated Nov. 30, 2018 (12 pages).

(Continued)

*Primary Examiner* — Aaron W Carter
(74) *Attorney, Agent, or Firm* — Finnegan, Henderson, Farabow, Garrett & Dunner, LLP (57) ABSTRACT

A defect displaying method is provided in the disclosure. The method comprises acquiring defect group information from an image of a wafer, wherein the defect group information includes a set of correlations between a plurality of defects identified from the image and one or more corre- (Continued)

sponding assigned defect types and displaying at least some of the plurality of defects according to their corresponding assigned defect types.

15 Claims, 6 Drawing Sheets

(56) References Cited

U.S. PATENT DOCUMENTS

| | | | |
|---|---|---|---|
| 6,999,614 B1 | 2/2006 | Bakker et al. | |
| 7,283,659 B1* | 10/2007 | Bakker | G06K 9/6254 |
| | | | 382/144 |
| 2004/0218806 A1* | 11/2004 | Miyamoto | G06T 7/0004 |
| | | | 382/145 |
| 2006/0078189 A1 | 4/2006 | Hosoya et al. | |
| 2006/0133661 A1 | 6/2006 | Takeda et al. | |
| 2007/0156379 A1* | 7/2007 | Kulkarni | G06F 30/30 |
| | | | 703/14 |
| 2010/0226562 A1 | 9/2010 | Wu et al. | |
| 2014/0169657 A1* | 6/2014 | Harada | H01L 22/12 |
| | | | 382/145 |
| 2014/0198974 A1* | 7/2014 | Takagi | H01L 22/12 |
| | | | 382/149 |
| 2015/0060667 A1* | 3/2015 | Yamaguchi | G06T 7/0004 |
| | | | 250/310 |
| 2016/0314237 A1* | 10/2016 | Luoh | G01R 31/2831 |
| 2016/0358041 A1 | 12/2016 | Venkataraman et al. | |
| 2019/0370950 A1* | 12/2019 | Fang | G06T 7/001 |
| 2020/0020092 A1* | 1/2020 | Fang | G06T 7/001 |

OTHER PUBLICATIONS

International Search Report and Written Opinion dated May 14, 2018, for corresponding PCT International Application No. PCT/EP2018/051171 (3 pages).

J. Furnkranz: "Decision-tree Learning" (XP 55460536 A) retrieved from the internet: http://www.ke.tu-darmstadt.de/lehre/archiv/ws0809/mldm/dt.pdf (58 pages).

* cited by examiner

DEFECT DISPLAYING METHOD

CROSS-REFERENCE TO RELATED APPLICATIONS

This application is a national stage filing under 35 U.S.C. § 371 of International Application No. PCT/EP2018/051171, filed on Jan. 18, 2018, and published as WO 2018/134290 A1, which is based upon and claims priority to U.S. Provisional Application No. 62/447,558, filed Jan. 18, 2017 and entitled "Smart Display for Defect Review," and to U.S. Provisional Application No. 62/616,407, filed Jan. 11, 2018, and entitled "Defect Displaying Method," and applications are incorporated herein by reference in their entireties.

TECHNICAL FIELD

The embodiments provided herein disclose a displaying method, and more particularly, a displaying method for defect reviewing in semiconductor fabrication operation process.

BACKGROUND

In various steps of a semiconductor manufacturing process, pattern defects can appear on a wafer, a chip, and/or a mask during the fabrication process, which can reduce the yield to a great degree. To meet the demand of high throughput and high yield of the manufacturing process, operators need to review a wafer, a chip, and/or a mask through a graphical user interface (GUI) displaying various patterns of objects under observation in display part of foundry equipment, and identify pattern defects at the earliest stage as possible. Unfortunately, identifying pattern defects can take a substantial amount of an operator's time, thereby hurting throughput.

SUMMARY

In some embodiments of the disclosure, a defect displaying method is provided. The method comprises acquiring defect group information from an image of a wafer, wherein the defect group information includes a set of correlations between a plurality of defects identified from the image and one or more corresponding assigned defect types and displaying at least some of the plurality of defects according to their corresponding assigned defect types.

In some embodiments of the disclosure, the defect displaying method further comprises acquiring a user input regarding the defect group information between the defect and its defect type and determining whether the user input includes one or more updates to the set of correlations.

In some embodiments of the disclosure, the defect displaying method further comprises in response to the user input includes one or more updates to the set of correlations, updating training data regarding the defect group information, incorporating the updated training data into a knowledge file stored in a knowledge recommendation server, and displaying at least some of the plurality of defects according to their corresponding updated defect types in accordance with the updated training data.

In some embodiments of the disclosure, a non-transitory computer readable medium is disclosed. The computer medium stores a set of instructions that is executable by one or more processors of an automatic defect classification server to cause the server to perform a method comprising acquiring defect group information from an image of a wafer, wherein the defect group information includes a set of correlations between a plurality of defects identified from the image and one or more corresponding assigned defect types and instructing a display to display at least some of the plurality of defects according to their corresponding assigned defect types.

In some embodiments of the disclosure, a defect displaying system is provided. The defect displaying system comprises a processor configured to acquire defect group information from an image of a wafer, wherein the defect group information includes a set of correlations between a plurality of defects identified from the image and one or more corresponding assigned defect types and a display configured to display at least some of the plurality of defects according to their corresponding assigned defect types.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

To facilitate and speed up the defect pattern identifying process, during the defect review process, defects on semiconductor wafers are automatically identified and classified into various defect types. While the defect classification can be performed automatically, user's intervention is always required to confirm the defects identified are correctly sorted and grouped. Therefore the way how efficiently the identified defected are presented to operators affect the efficiency of the defect identification process, and further affect the throughput of the manufacturing process.

Figure 1:
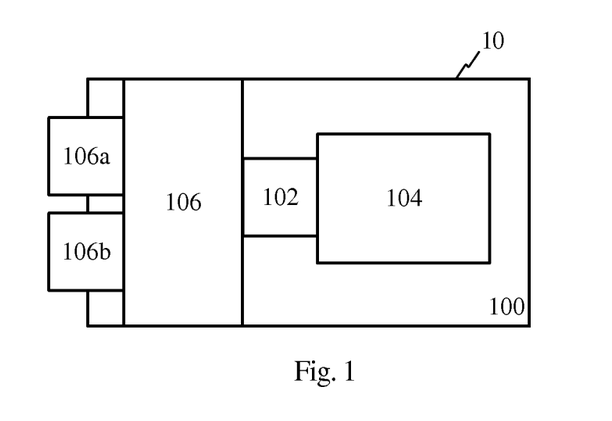
FIG. 1 is a schematic diagram illustrating an exemplary electron beam inspection (EBI) system, consistent with embodiments of the present disclosure.

Reference is now made to FIG. 1, which is a schematic diagram illustrating an exemplary electron beam inspection (EBI) system, consistent with embodiments of the present disclosure. FIG. 1 illustrates an exemplary electron beam inspection (EBI) system 100 consistent with embodiments of the present disclosure. As shown in FIG. 1, EBI system 100 includes a main chamber 101, a load/lock chamber 102, an electron beam tool 104, and an equipment front end module (EFEM) 106. Electron beam tool 104 is located within main chamber 101. EFEM 106 includes a first loading port 106a and a second loading port 106b. EFEM 106 may include additional loading port(s). First loading port 106a and second loading port 106b receive wafer cassettes that contain wafers (e.g., semiconductor wafers or wafers made of other material(s)) or samples to be inspected (wafers and samples are collectively referred to as "wafers" hereafter). One or more robot arms (not shown) in EFEM 106 transport the wafers to load/lock chamber 102. Load/lock chamber 102 is connected to a load/lock vacuum pump system (not shown) which removes gas molecules in load/lock chamber 102 to reach a first pressure below the atmospheric pressure. After reaching the first pressure, one or more robot arms (not shown) transport the wafer from load/lock chamber 102 to main chamber 101. Main chamber 101 is connected to a main chamber vacuum pump system (not shown) which removes gas molecules in main chamber 101 to reach a second pressure below the first pressure. After reaching the second pressure, the wafer is subject to inspection by electron beam tool 104.

Figure 2:
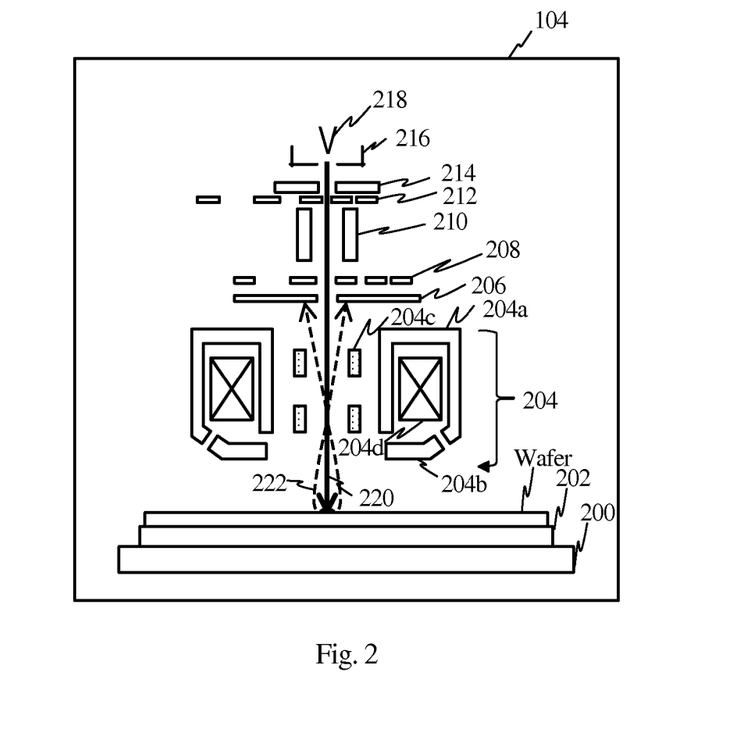
FIG. 2 is a schematic diagram illustrating an exemplary electron beam tool that can be a part of the exemplary electron beam inspection of FIG. 1, consistent with embodiments of the present disclosure.

Reference is now made to FIG. 2, which is a schematic diagram illustrating an exemplary electron beam tool that can be a part of the exemplary electron beam inspection of FIG. 1, consistent with embodiments of the present disclosure. FIG. 2 illustrates exemplary components of electron beam tool 104, consistent with embodiments of the present disclosure. As shown in FIG. 2, electron beam tool 104 includes a motorized stage 200, and a wafer holder 202 supported by motorized stage 200 to hold a wafer 203 to be inspected. Electron beam tool 104 further includes an objective lens assembly 204, electron detector 206 (which includes electron sensor surfaces 206a and 206b), an objective aperture 208, a condenser lens 210, a beam limit aperture 212, a gun aperture 214, an anode 216, and a cathode 218. Objective lens assembly 204, in one embodiment, can include a modified swing objective retarding immersion lens (SORIL), which includes a pole piece 204a, a control electrode 204b, a deflector 204c, and an exciting coil 204d. Electron beam tool 104 may additionally include an energy dispersive X-ray spectrometer (EDS) detector (not shown) to characterize the materials on the wafer.

A primary electron beam 220 is emitted from cathode 218 by applying a voltage between anode 216 and cathode 218. Primary electron beam 220 passes through gun aperture 214 and beam limit aperture 212, both of which can determine the size of electron beam entering condenser lens 210, which resides below beam limit aperture 212. Condenser lens 210 focuses primary electron beam 220 before the beam enters objective aperture 208 to set the size of the electron beam before entering objective lens assembly 204. Deflector 204c deflects primary electron beam 220 to facilitate beam scanning on the wafer. For example, in a scanning process, deflector 204c can be controlled to deflect primary electron beam 220 sequentially onto different locations of top surface of wafer 203 at different time points, to provide data for image reconstruction for different parts of wafer 203. Moreover, deflector 204c can also be controlled to deflect primary electron beam 220 onto different sides of wafer 203 at a particular location, at different time points, to provide data for stereo image reconstruction of the wafer structure at that location. Further, in some embodiments, anode 216 and cathode 218 can be configured to generate multiple primary electron beams 220, and electron beam tool 104 can include a plurality of deflectors 204c to project the multiple primary electron beams 220 to different parts/sides of the wafer at the same time, to provide data for image reconstruction for different parts of wafer 203.

Exciting coil 204d and pole piece 204a generate a magnetic field that begins at one end of pole piece 204a and terminates at the other end of pole piece 204a. A part of wafer 203 being scanned by primary electron beam 220 can be immersed in the magnetic field and can be electrically charged, which, in turn, creates an electric field. The electric field reduces the energy of impinging primary electron beam 220 near the surface of the wafer before it collides with the wafer. Control electrode 204b, being electrically isolated from pole piece 204a, controls an electric field on the wafer to prevent micro-arching of the wafer and to ensure proper beam focus.

A secondary electron beam 222 can be emitted from the part of wafer 203 upon receiving primary electron beam 220. Secondary electron beam 222 can form a beam spot (e.g., one of beam spots 240a and 240b) on sensor surfaces 206a and 206b of electron detector 206. Electron detector 206 can generate a signal (e.g., a voltage, a current, etc.) that represents an intensity of the beam spot, and provide the signal to a processing system (not shown in FIG. 2). The intensity of secondary electron beam 222, and the resultant beam spot, can vary according to the external and/or internal structure of wafer 203. Moreover, as discussed above, primary electron beam 220 can be projected onto different locations of the top surface of the wafer, and/or different sides of the wafer at a particular location, to generate secondary electron beams 222 (and the resultant beam spot) of different intensities. Therefore, by mapping the intensities of the beam spots with the locations of wafer 203, the processing system can reconstruct an image that reflects the internal and/or external structures of wafer 203.

Figure 3:
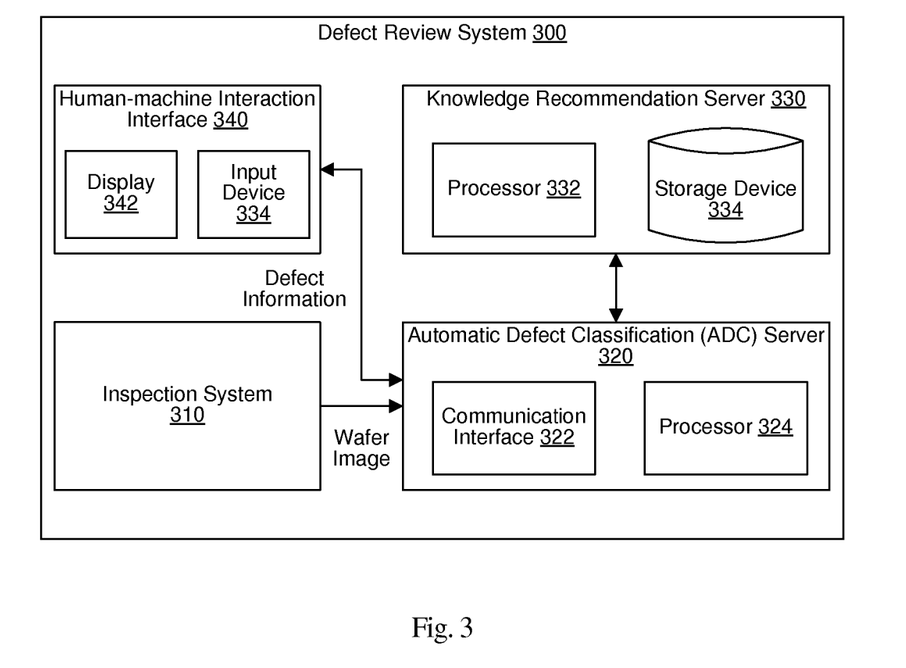
FIG. 3 is a block diagram illustrating an exemplary defect review system, consistent with embodiments of the present disclosure.

Reference is now made to FIG. 3, which is a block diagram illustrating an exemplary defect review system, consistent with embodiments of the present disclosure. Once a wafer image is acquired, the wafer image may be transmitted to a computer system where the system can identify defects on the wafer image, and classify the defects into categories according to the type of the defects. Defect information is further displayed in a display part of a human-machine interaction interface and operators' feedback can be collected through an input device of the human-machine interaction interface.

Referring to FIG. 3, defect review system 300 includes a wafer inspection system 310, an Automatic Defect Classification (ADC) server 320, a knowledge recommendation server 330 electrically coupled to ADC server 320, and a human-machine interaction interface 340 electrically couple to ADC server 320. Wafer inspection system 310 can be electron beam inspection (EBI) system 100 described with respect to FIG. 1. It is appreciated that ADC server 320, knowledge recommendation server 330, and human-machine interaction interface 340 can be part of and/or remote from EBI system 100.

Wafer inspection system 310 can be any inspection system that can generate an inspection image of a wafer. The wafer can be a semiconductor wafer substrate, or a semiconductor wafer substrate having one or more epi-layers and/or process films. Wafer inspection system 310 can be any currently available or developing wafer inspection system. The embodiments of the present disclosure does not limit the specific type for wafer inspection system 310 as long as it can generate a wafer image having a resolution high enough to observe key features on the wafer (e.g., less than 20 nm), consistent with contemporary semiconductor foundry technologies.

ADC server 320 has a communication interface 322 that is electrically coupled to the wafer inspection system 310 to receive the wafer image. ADC server 320 also includes a processor 324 that is configured to analyze the wafer image, and detect and classify wafer defects that appear on the wafer image by using a defect knowledge file. The defect knowledge file can be manually provided to ADC server 320 by an operator. Alternatively, the defect knowledge file can be automatically provided to ADC server 320 by knowledge recommendation server 330, which will be described in detail below.

Knowledge recommendation server 330 is electrically coupled to ADC server 320. Knowledge recommendation server 330 includes a processor 332 and a storage device 334. Processor 332 is configured to build a plurality of defect knowledge files, and store the plurality of defect knowledge files in storage device 334.

The plurality of defect knowledge files contains information related to various types of defects generated during various stages of a wafer manufacturing process. The various stages of a wafer manufacturing process may include, but is not limited to, a lithography process, an etching process, a chemical mechanical polishing (CMP) process, and an interconnection forming process. Defects generated in the lithographic process may include, but are not limited to, photoresist (RP) residue defects due to PR deterioration or impurity, peeling defects, bridge defects, bubble defects, and dummy pattern missing defects due to pattern shift. Defects generated in an etching process may include, but are not limited to, etching residue defects, over-etching, defects and open circuit defect. Defects generated in a CMP process may include, but are not limited to, slurry residue defects, dishing defects, and erosion defects due to variance in polishing rates, and scratched due to polishing. Defects generated in an interconnection forming process may include, but are not limited to, broken line defects, void defects, extrusion defects, and bridge defects.

Processor 332 is configured to build the plurality of defect knowledge files based on a plurality of defect patch images. The plurality of defect patch images can be generated by a wafer inspection tool, such as electron beam tool 104 illustrated in FIG. 2. A defect patch image is a small image (e.g., 34×34 pixels) of a portion of the wafer that contains a defect. The defect patch image is usually centered on the defect, and includes neighboring pixels of the defect.

Human-machine interaction interface 340 is electrically couple to ADC server 320. Human-machine interaction interface 340 includes at least a display 342 and an input device 344. Human-machine interaction interface 340 is built to exchange defect and defect classification information between defect review system 300 and operators.

Once a knowledge file is chosen, processor 324 of ADC server 320 processes wafer images sent from inspection system 310 and identifies defects generated in various semiconductor manufacturing processes. Identified defects are sent to a display 342 of a human-machine interaction interface 340 for displaying defect information to operators for review and confirmation. If any discrepancies or mistakes of classification of defects are observed by an operator, an input device 344 can be used to provide feedback defect information to ADC server 320 through human-machine interaction interface 340.

It is appreciated that display 342 can be any type of a computer output surface and projecting mechanism that shows text and graphic images, including but not limited to, cathode ray tube (CRT), liquid crystal display (LCD), light-emitting diode (LED), gas plasma, a touch screen, or other image projection technologies, for displaying information to a computer user. It is also appreciated that input device 344 can be any type of a computer hardware equipment used to provide data and control signals from an operator to defect review system 300. Input device 344 may include, but is not limited to, a keyboard, a mouse, a scanner, a digital camera, a joystick, a trackball, cursor direction keys, a touchscreen monitor, or audio/video commanders, etc., for communicating direction information and command selections to processor and/or for controlling cursor movement on display. The input device typically has two degrees of freedom in two axes, a first axis (for example, x) and a second axis (for example, y), that allows the device to specify positions in a plane.

Figure 4:
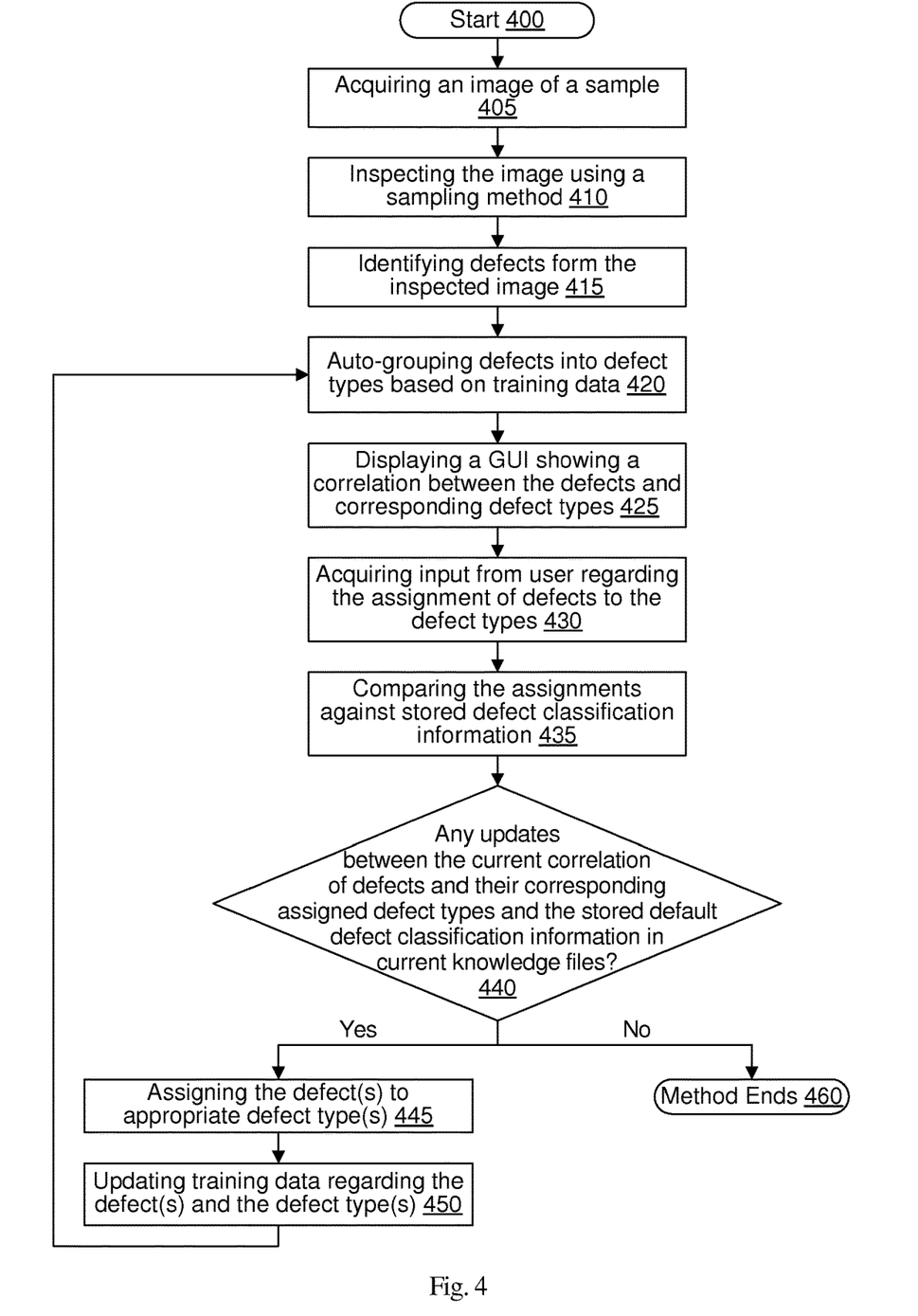
FIG. 4 is a flowchart illustrating an exemplary process of defect identification, classification, displaying, reviewing, and updating of a defect review system, consistent with embodiments of the present disclosure.

Reference is now made to FIG. 4, which is a flowchart illustrating an exemplary process of defect identification, classification, displaying, reviewing, and updating of a defect review system, consistent with embodiments of the present disclosure. Process 400 can be performed by a defect review system including a defect classification server (e.g., ADC server 320 in FIG. 3) and a human-machine interaction interface device (e.g., human-machine interaction interface 340 in FIG. 3 with at least a display 342 and an input device 344). The defect classification server may be coupled to, either by a communication cable or wirelessly over a network, an inspection tool (e.g., electron beam tool 104 in FIG. 2), a human-machine interaction interface device (e.g., human-machine interaction interface 340 in FIG. 3), and a knowledge recommendation server (e.g., knowledge recommendation server 330 in FIG. 3).

As illustrated in FIG. 4, first, at step 405, the defect classification server acquires a wafer inspection image generated by an inspection system. At step 410, the defect classification server inspects and analyzes the inspection image. A sampling method of inspection can be adopted to improve the throughput of the inspection process. At step 415, the defect classification server automatically identifies defects from the inspected image. Identification of a defect can be achieved by processing an acquired image of a sample and comparing processed image data with defect information stored in the knowledge file adopted by the defect classification server. Processing of the acquired image of a sample includes at least capturing geometric features of patterns shown in the image of a sample. And at step 420, identified defects are automatically grouped into defect types based on training data in knowledge files used for defect classification in the defect classification server. Defects detected to have similar geometric features may be grouped together. Such geometric features may include number of sides, number of angles, dimension, shape, or the combination of any features thereof. In some embodiments, not all defects may be affiliated with a specified defect type or could be considered a miscellaneous type of defect that may need input from the operator (e.g., see Others category from FIG. 6).

Figure 5:
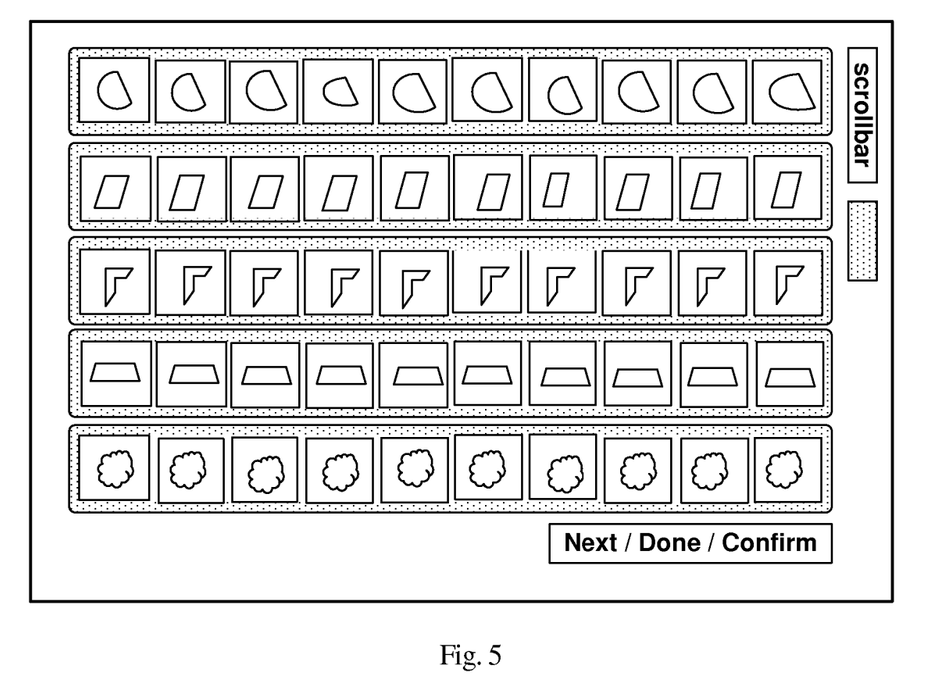
FIG. 5 is a schematic diagram illustrating an exemplary display interface of defect classification for review of operators, consistent with embodiments of the present disclosure.

Using the correlation between the identified defects and defect types, at step 425, the defect review system (e.g., display 342 of FIG. 3) displays a graphic user interface (GUI) page showing a correlation between the identified defects and the corresponding classified defect types. An exemplary GUI page is illustrated in FIG. 5, which will be further explained in detail below.

The displayed auto-grouping defect information can allow operators to quickly review identified defects and defect types and provide feedback regarding the defect classification results. Such feedback can be confirmation of the current classification displayed (e.g., on display 342) when operators see no discrepancies or mistakes of defect classification based on his/her empirical judgement. Such feedback can also cause a re-assignment of defect to another defect type when operators see discrepancies or mistakes of defect classification based on his/her empirical judgement. At step 430, these inputs from operators regarding the assignment of defects to the defect types are acquired.

Upon receiving of operators' inputs, defect classification server compares the confirmation/assignment against stored defect classification information in current knowledge files at step 435, and further determines if there is any updates between the current correlation of defects and their corresponding assigned defect types and the stored default defect classification information in current knowledge files at step 440. If the existence of any updates has been determined, operators' input supersedes and the defect type assigned by operators is viewed as appropriate and further assigned to the defect.

If there is an update to the correlation between a defect and its corresponding defect type, defect classification server assigns the defect to its appropriate defect type based on feedback of operators at step 445. Moreover, the defect review system proceeds to update its training data regarding the defect and the corresponding defect type at step 450. The updated training data is incorporated in knowledge files and adopted instantaneously in the ongoing defect classification process for classifying of rest defects identified. The process loops back to step 420 to further auto-group the defects for displaying an updated GUI page showing an updated correlation between defects and corresponding defect types.

A processor of a knowledge recommendation server (e.g., processor 332 of knowledge recommendation server 330 in FIG. 3) is configured to implement a defect data training method, which includes updating training data at step 450. This updated training data can be used for assisting with grouping defects and defect types for the current sample or a subsequent sample (e.g., auto-grouping step 420).

The acquired input from the operator regarding the correlation information between a defect and its assigned defect type helps build and update the training data. For example, the processor can acquire this input. The acquired input of defect correlation information is thereafter compared with a stored set of defect correlation information between defects and corresponding defect types in the current knowledge file. The stored set of defect correlations can be based on the grouping function provided in the auto-grouping step 420.

In some embodiments, a defect in the stored set of defect correlation information shares a same defect with the received input of defect correlation information. If the displayed defect correlation is correct, the operator can confirm the correlation information and that confirmation can be used for updating the training data. In particular, the processor of knowledge server retains the stored set of defect correlation information between a plurality of defects and corresponding defect types.

If the displayed defect correlation is not perceived to be accurate, the operator can update the correlation information. Due to this update, the processor can update the training data by instructing the memory to replace the stored defect correlation information with the received input defect correlation information between the defect and corresponding defect type. The operator's input of defect correlation information can supersede the stored defect correlation information in the knowledge file.

If the displayed defect has not been assigned to a defect type or if the displayed defect has been assigned to a miscellaneous type of defect that may need input from the operator (e.g., see Others category from FIG. 6), the operator may assign the displayed defect to either a new defect type or an existing defect type. Due to this update, the processor can update the training data in the knowledge file by adding a new defect type correlating the defect with the new defect type or by assigning the defect to an existing defect type.

In some embodiments, if no existence of any updates has been determined at step 440, the auto-grouping defect information provided by ADC server are reviewed and approved by operators. After step 460, the process is completed.

Reference is now made to FIG. 5, which is a schematic diagram illustrating an exemplary display interface of defect classification for review of operators, consistent with embodiments of the present disclosure. As shown in FIG. 5, identified and classified defects are displayed in a graphic user interface (GUI) page of display 342 in a manner that defects belonging to the same defect type are grouped together and displayed in the same line.

A line of displayed defect type may include one or more identified defects of the wafer under observation. The one or more identified defects can have different orientation, angle, size, dimensions, or other geometric characteristics, but all of them should have similar key geometric characteristics, such as numbers of straight line and numbers of curved line, that make them belong to a same type of geometric shape and a same defect type.

One GUI page can at the same time display more than one defect type in multiple lines with each defect type having multiple identified defects. A defect belonging to a same defect type is grouped and displayed together in a line with defects sharing the same defect type. Multiple types of defects are laid line by line in an order of being identified by processor 324 of ADC server 320. It is appreciated that multiple types of defects can also be laid line by line in any other order which is processed by ADC server 320 and which may bring greater convenience and efficiency for operators to differentiate and confirm types of defect between lines. It is also appreciated that the grouped defects belonging to a defect type can be configured to be displayed in another manner, such as vertically, via a quadrant, etc., to allow the operator to review the defects in a quicker manner.

To facilitate operators' review process, lines of defects can be encircled by rectangles of various colors. Operators are informed with classification of defects in an intuitionistic way. It is appreciated that other highlighting display designs can be used to make grouping information conspicuous and ergonomically reasonable to operators so that review process is made smoother and faster.

In one process step of defect inspection, it is possible more than a few types of defects are identified. A scrollbar can be used to facilitate reviewing when the number of type of defect is abundant. The position of the scrollbar may represent the position of the current screen in the page of GUI, and the length of the scrollbar may represent percentage of types of defects in the current screen against the total types of defects in the page of GUI. Operators can scroll up and down to complete reviewing of defects and types of defects in the page of GUI in one round of reviewing.

Once the reviewing process is done, if no discrepancies or mistakes of defect classification have been observed, operators can press a "Next/Done/Confirm" button to confirm completion of reviewing in the page of GUI and move to next step. If a discrepancy or mistake of defect classification has been observed and marked out by operators in the GUI page of defect reviewing, operators can click on the defect wrongly assigned to a defect type, and re-assign the defect to the correct defect type. A color code can be used the display the change of the defect type in the screen.

Figure 6:
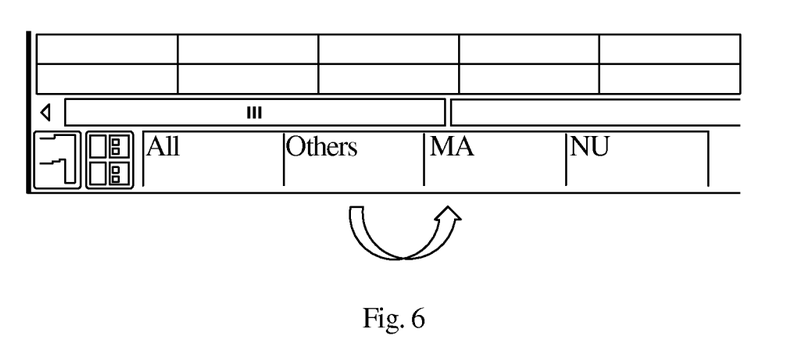
FIG. 6 is a schematic diagram illustrating an exemplary GUI page of switching defect classification for operators' selection, consistent with embodiments of the present disclosure.

Reference is now made to FIG. 6, which is a schematic diagram illustrating an exemplary GUI page of switching defect classification for operators' selection, consistent with embodiments of the present disclosure.

In some embodiments, types of defects can be grouped and named with abbreviations, and presented to operators by selection tabs. Operators can be prompted to a selection page of defect type at the beginning of a reviewing process or when operators are done with a review of a precedent defect type. Operators have the flexibility to select the next defect type to be reviewed. After a next defect type to be reviewed is selected, the screen can jump into a GUI page of defect reviewing for the selected defect type.

If a change of defect classification has been made by operators in a precedent GUI page of defect reviewing, as explained in the flow chart of FIG. 4, training data can be sent to knowledge recommendation server 330 and update knowledge files regarding the defect and the defect type. Updated knowledge files can be sent back to ADC server 320 so that ADC server 320 can re-assign the rest of the defects accordingly based on the updated knowledge files. By doing so, when operators select and switch to review the next set of defect types at GUI page as shown in FIG. 6, defects assigned to the selected defect type have been updated and wrongly assigned defects using previous knowledge files, if any, have been removed/added.

Figure 7:
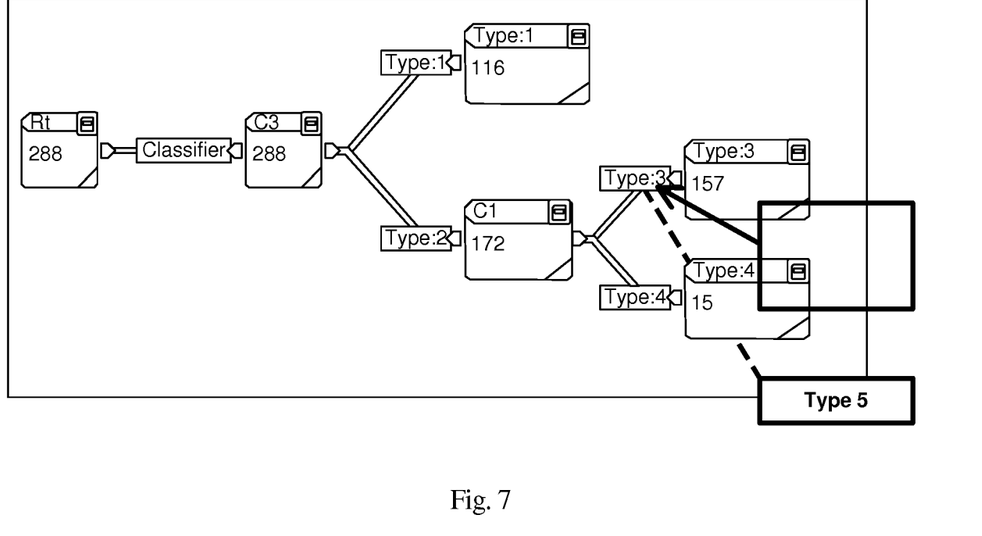
FIG. 7 is a chart illustrating an exemplary creation process of new defect type during defect classification, consistent with embodiments of the present disclosure.

Reference is now made to FIG. 7, which is a chart illustrating an exemplary creation process of new defect type during defect classification, consistent with embodiments of the present disclosure. In an deflect classification process, it is possible that a defect is classified into any existing defect types in the knowledge files, and it is also possible that a defect is not decided to belong to any existing defect types in the knowledge files. In this scenario, a new defect type may be created.

Defects are classified into various defect types in a tree algorithm based on geometric characteristics of various defects in process of assigning the defect to appropriate defect type. As an example, after processor 324 received a defect, the first layer of the tree algorithm may have two branches, defect type 1 and defect type 2, as shown in FIG. 7. Under defect type 2, there are two branches: one for defect type 3 and one for defect type 4. If the received defect is decided to have more characteristics of defect type 2 than defect type 1, and if the similarity between the received defect and the defect type 2 meets or exceeds a confidence level, it is classified to branch defect type 2 as a first step. The confidence level can be preset at a preferred value by operators, e.g., 70%. Thereafter, processor 324 of ADC server 320 can continue to compare a received defect with sub-categories under defect type 2, which are defect type 3 and defect type 4 in this exemplary embodiment. If none of the comparisons of received defect with defect type 3 and defect type 4 meets or exceeds the confidence level of similarity, the received defect is determined to be a new type of defect. Processor 324 is configured to create a new defect type in this condition, and classify the received defect to the newly created defect type.

The creation of the new defect type is a forward tracing step. A type node of the new defect type is configured to locate at a node parallel to the original type node in which level the received defect fails to be classified to any defect types of the level. In this case, the received defect is not classified to either one of defect type 3 and defect type 4 with confidence level of similarity met or exceeded. Therefore, a type node of the new defect type is created parallel to defect type 3 and defect type 4 as defect type 5 in the same level of the tree algorithm under defect type 2.

Figure 8:
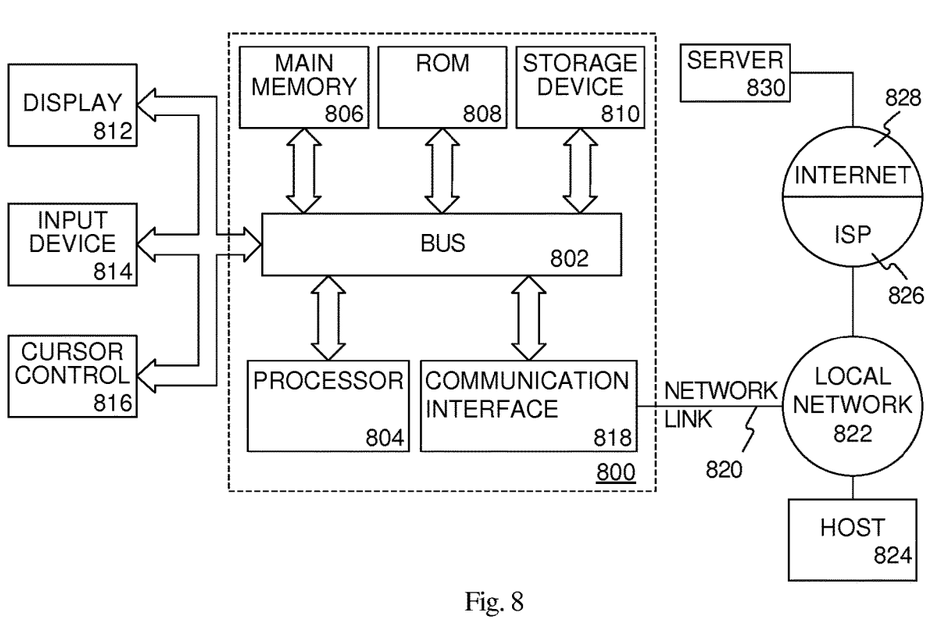
FIG. 8 is a block diagram of an exemplary computer system on which embodiments described herein can be implemented.

Reference is now made to FIG. 8, which is a block diagram of an exemplary computer system on which embodiments described herein can be implemented. At least one of the knowledge recommendation server and the defect classification server described above can be implemented with computer system 800.

Computer system 800 includes a bus 802 or other communication mechanism for communicating information, and one or more hardware processors 804 (denoted as processor 804 for purposes of simplicity; e.g., processor 332 of knowledge recommendation server 330 or processor 324 of defect classification server 320 of FIG. 3) coupled with bus 802 for processing information. Hardware processor 804 can be, for example, one or more microprocessors.

Computer system 800 also includes a main memory 806, such as a random access memory (RAM) or other dynamic storage device, coupled to bus 802 for storing information and instructions to be executed by processor 804. Main memory 806 also can be used for storing temporary variables or other intermediate information during execution of instructions to be executed by processor 804. Such instructions, after being stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810 (e.g., storage device 334 of knowledge recommendation server 330 of FIG. 3), such as a magnetic disk, optical disk, or USB thumb drive (Flash drive), etc., is provided and coupled to bus 802 for storing information and instructions.

Computer system 800 can be coupled via bus 802 to a display 812. An input device 814, including alphanumeric and other keys, is coupled to bus 802 for communicating information and command selections to processor 804. Another type of user input device is cursor control 816.

Computing system 800 can include a user interface module to implement a graphical user interface (GUI) that can be stored in a mass storage device as executable software codes that are executed by the one or more computing devices. This and other modules can include, by way of example, components, such as software components, object-oriented software components, class components and task components, processes, functions, fields, procedures, subroutines, segments of program code, drivers, firmware, microcode, circuitry, data, databases, data structures, tables, arrays, and variables. The modules may include, for example, one or more components of system 300 illustrated in FIG. 3.

Computer system 800 can implement the techniques described herein using customized hard-wired logic, one or more ASICs or FPGAs, firmware and/or program logic which in combination with the computer system causes or programs computer system 800 to be a special-purpose machine. According to some embodiments, the operations, functionalities, and techniques and other features described herein are performed by computer system 800 in response to processor 804 executing one or more sequences of one or more instructions contained in main memory 806. Such instructions can be read into main memory 806 from another storage medium, such as storage device 810. Execution of the sequences of instructions contained in main memory 806 causes processor 804 to perform the method steps (e.g., process 400 of FIG. 4, or process 700 of FIG. 7) described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 810. Volatile media can include dynamic memory, such as main memory 806. Non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, register, cache, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 802. Transmission media can also take the form of acoustic or light waves, such as those generated during radio-wave and infra-red data communications.

Various forms of media can be involved in carrying one or more sequences of one or more instructions to processor 804 for execution. For example, the instructions can initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 can optionally be stored on storage device 810 either before or after execution by processor 804.

Computer system 800 can also include a communication interface 818 coupled to bus 802. Communication interface 818 (e.g., communication interface 322 of defect classification server 320 of FIG. 3 or any communication interface (not shown) of knowledge recommendation server 330) can provide a two-way data communication coupling to a network link 820 that can be connected to a local network 822. For example, communication interface 818 can be an integrated services digital network (ISDN) card, cable modem, satellite modem, or a modem to provide a data communication connection to a corresponding type of telephone line. As another example, communication interface 818 can be a local area network (LAN) card to provide a data communication connection to a compatible LAN. Wireless links can also be implemented. In any such implementation, communication interface 818 can send and receive electrical, electromagnetic or optical signals that carry digital data streams representing various types of information.

Network link 820 can typically provide data communication through one or more networks to other data devices. For example, network link 820 can provide a connection through local network 822 to a host computer 824 or to data equipment operated by an Internet Service Provider (ISP) 826. ISP 826 in turn can provide data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, can be example forms of transmission media.

Computer system 800 can send messages and receive data, including program code, through the network(s), network link 820 and communication interface 818. In the Internet example, a server 830 can transmit a requested code for an application program through Internet 828, ISP 826, local network 822 and communication interface 818.

The received code can be executed by processor 804 as it is received, and/or stored in storage device 810, or other non-volatile storage for later execution. In some embodiments, server 830 can provide information for being displayed on a display.

According to the above disclosed embodiments, a defect review system includes a knowledge recommendation server that can provide recommended knowledge files to a defect classification server which can classify defects by using the knowledge files. Compared to a typical defect review system in which a user needs to visually analyze a newly acquired wafer inspection image, and spent significant time searching for a knowledge file for use in defect classification, the defect review system of the disclosed embodiments can perform the entire defect review process in a real-time scenario, i.e., as soon as wafer inspection images are generated without user intervention. As a result, the throughput of the defect review process is increased.

In addition, the typical defect review system relies on users' experience to select knowledge files for use in defect classification, which may cause inaccurate defect classification results. In contrasts, the knowledge recommendation system of the disclosed embodiments searches for knowledge files based on defect feature parameters exacted from defect patch image, which can generate more accurate results.

The embodiments may further be described using the following clauses:

1. A defect displaying method comprising:
    acquiring defect group information from an image of a wafer, wherein the defect group information includes a set of correlations between a plurality of defects identified from the image and one or more corresponding assigned defect types; and displaying at least some of the plurality of defects according to their corresponding assigned defect types.
2. The defect displaying method of clause 1 further comprising,
    acquiring a user input regarding the defect group information between the defect and its defect type; and determining whether the user input includes one or more updates to the set of correlations.

3. The defect displaying method of clause 2 further comprising,
   in response to the user input includes one or more updates to the set of correlations, updating training data regarding the defect group information.
4. The defect displaying method of clause 3 further comprising,
   incorporating the updated training data into a stored knowledge file; and displaying at least some of the plurality of defects according to their corresponding updated defect types in accordance with the updated training data.
5. The defect displaying method of clause 2 further comprising,
   in response to the user input includes one or more updates to the set of correlations, assigning an updated defect type to the defect in accordance with the one or more updates to the set of correlations.
6. The defect displaying method of clause 2, wherein the acquired user input is confirmation of the set of correlations between the plurality of defects and their corresponding defect types.
7. The defect displaying method of clause 2, wherein the acquired user input is an assignment of a second set of correlations between the plurality of defects and their corresponding defect types.
8. The defect displaying method of clause 1, wherein displaying at least some of the plurality of defects further comprises displaying a plurality groups of defects according to their corresponding assigned defect types in a plurality of lines.
9. The defect displaying method of clause 1, wherein the set of correlations comprises a first set of defects assigned to a first defect type, and a second set of defects assigned to a second defect type.
10. The defect displaying method of clause 9, wherein displaying comprises distinguishing the first set of defects from the second set of defects in a visual manner.
11. The defect displaying method of clause 1, wherein the acquired defect group information is achieved by assigning a new defect type not in the training data of a knowledge file, the assigning comprising:
    comparing the defect with a tree algorithm of defect type in training data of a knowledge file;
    creating a new defect type in response to the comparing returning a confidence level of similarity less than a preset value; and
    assigning the defect to the new defect type.
12. The defect displaying method of clause 11, wherein comparing the defect with the tree algorithm of defect type in training data of the knowledge file further comprises:
    comparing the defect with categories of defect type at first level, comparing the defect with categories of defect type at second level, and determining the comparison of the second level having the confidence level of similarity less than a preset value, and
    wherein creating the new defect type further comprises creating the new defect type at the second level of the tree algorithm of defect type.
13. A non-transitory computer readable medium storing a set of instructions that is executable by one or more processors of a server to cause the server to perform a method comprising:
    acquiring defect group information from an image of a wafer, wherein the defect group information includes a set of correlations between a plurality of defects identified from the image and one or more corresponding assigned defect types; and
    instructing a display to display at least some of the plurality of defects according to their corresponding assigned defect types.
14. The non-transitory computer readable medium of clause 13, wherein the set of instructions that is executable by one or more processors of the server to cause the server to further perform:
    acquiring a user input regarding the defect group information between the defect and its defect type; and
    determining whether the user input includes one or more updates to the set of correlations.
15. The non-transitory computer readable medium of clause 14, wherein the set of instructions that is executable by one or more processors of the server to cause the server to further perform:
    in response to the user input includes one or more updates to the set of correlations, updating training data regarding the defect group information.
16. The non-transitory computer readable medium of clause 15, wherein the set of instructions that is executable by one or more processors of the server to cause the server to further perform:
    instructing a knowledge recommendation server to incorporate the updated training data into a stored knowledge file stored in the knowledge recommendation server; and
    instructing the display to display at least some of the plurality of defects according to their corresponding updated defect types in accordance with the updated training data.
17. The non-transitory computer readable medium of clause 14, wherein the set of instructions that is executable by one or more processors of the server to cause the server to further perform:
    in response to the user input includes one or more updates to the set of correlations, assigning an updated defect type to the defect in accordance with the one or more updates to the set of correlations.
18. The non-transitory computer readable medium of clause 14, wherein the acquired user input is confirmation of the set of correlations between the plurality of defects and their corresponding defect types.
19. The non-transitory computer readable medium of clause 14, wherein the acquired user input is an assignment of a second set of correlations between the plurality of defects and their corresponding defect types.
20. The non-transitory computer readable medium of clause 13, wherein the displaying at least some of the plurality of defects further comprises displaying a plurality groups of defects according to their corresponding assigned defect types in a plurality of lines.
21. The non-transitory computer readable medium of clause 13, wherein the set of correlations comprises a first set of defects assigned to a first defect type, and a second set of defects assigned to a second defect type.
22. The non-transitory computer readable medium of clause 21, wherein the displaying comprises distinguishing the first set of defects from the second set of defects in a visual manner.
23. The non-transitory computer readable medium of clause 13, wherein the acquired defect group information is achieved by assigning a new defect type not in the training data of a knowledge file, the assigning comprising, comparing the defect with a tree algorithm of defect type in training data of a knowledge file; creating a new defect type in response to the comparing returning a confidence level of similarity less than a preset value; and assigning the defect to the new defect type.

24. The non-transitory computer readable medium of clause 23, wherein comparing the defect with the tree algorithm of defect type in training data of the knowledge file further comprises:

comparing the defect with categories of defect type at first level, comparing the defect with categories of defect type at second level, and determining the comparison of the second level having the confidence level of similarity less than a preset value, and wherein creating the new defect type further comprises creating the new defect type at the second level of the tree algorithm of defect type.

25. A defect displaying system, comprising:

a processor configured to acquire defect group information from an image of a wafer, wherein the defect group information includes a set of correlations between a plurality of defects identified from the image and one or more corresponding assigned defect types; and a display configured to display at least some of the plurality of defects according to their corresponding assigned defect types.

26. The defect display system of clause 25 further comprising, an input device configured to acquire a user input regarding the defect group information between the defect and its defect type; and the processor further configured to determine whether the user input includes one or more updates to the set of correlations.

27. A defect data training method for assisting with distinguishing one or more defects on an image of a wafer, the method comprising:

receiving a user input of defect correlation information between a defect and a corresponding defect type;

comparing the input defect correlation information between the defect and the corresponding defect type with a stored set of defect correlation information between a plurality of defects and corresponding defect types; and updating, based on the comparison, the correlation information between the defect and the corresponding defect type in the stored set of defect correlation information.

28. The defect data training method of clause 27, wherein updating the correlation information between the defect and the corresponding defect type in the stored set of defect correlation information comprise:

replacing the stored defect correlation information between the defect and corresponding defect type with the input defect correlation information between the defect and corresponding defect type.

29. The defect data training method of clause 27, wherein updating the correlation information between the defect and the corresponding defect type in the stored set of defect correlation information comprise:

adding the input defect correlation information between the defect and corresponding defect type to the stored set of defect correlation information between a plurality of defects and corresponding defect types.

30. The defect data training method of clause 27, wherein updating the correlation information between the defect and the corresponding defect type in the stored set of defect correlation information comprise:

retaining the stored set of defect correlation information between a plurality of defects and corresponding defect types.

31. The defect data training method of one of clauses 27-30, further comprising, sending the updated set of defect correlation information to a defect classification server configured to classify defects of an image of a wafer for displaying.

32. A non-transitory computer readable medium storing a set of instructions that is executable by one or more processors of a server to cause the server to perform a method for assisting with distinguishing one or more defects on an image of a wafer, the method comprising:

receiving a user input of defect correlation information between a defect and a corresponding defect type;

comparing the input defect correlation information between the defect and the corresponding defect type with a stored set of defect correlation information between a plurality of defects and corresponding defect types; and updating, based on the comparison, the correlation information between the defect and the corresponding defect type in the stored set of defect correlation information.

33. The non-transitory computer readable medium of clause 32, wherein updating the correlation information between the defect and the corresponding defect type in the stored set of defect correlation information comprise:

replacing the stored defect correlation information between the defect and corresponding defect type with the input defect correlation information between the defect and corresponding defect type.

34. The non-transitory computer readable medium of clause 32, wherein updating the correlation information between the defect and the corresponding defect type in the stored set of defect correlation information comprise:

adding the input defect correlation information between the defect and corresponding defect type to the stored set of defect correlation information between a plurality of defects and corresponding defect types.

35. The non-transitory computer readable medium of clause 32, wherein updating the correlation information between the defect and the corresponding defect type in the stored set of defect correlation information comprise:

retaining the stored set of defect correlation information between a plurality of defects and corresponding defect types.

36. The non-transitory computer readable medium of one of clauses 32-35, wherein the set of instructions that is executable by one or more processors of the server to cause the server to further perform:

sending the updated set of defect correlation information to a defect classification server configured to classify defects of an image of a wafer for displaying.

While the present invention has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A defect displaying method comprising,
   acquiring defect group information from an image of a wafer, wherein the defect group information includes a set of correlations between a plurality of defects identified from the image and one or more corresponding assigned defect types, and the defect group information being automatically generated based on training data;
   displaying at least some of the plurality of defects according to their corresponding assigned defect types;
   acquiring a user input regarding the defect group information between a defect among the displayed defects and its defect type;
   comparing the input defect group information between the defect and its defect type with the set of correlations between the plurality of defects and the one or more corresponding assigned defect types; and
   updating, based on the comparison, the training data by updating the defect group information between the defect and its defect type in the set of correlations.

2. The defect displaying method of claim 1 further comprising,
   determining whether the user input includes one or more updates to the set of correlations.

3. The defect displaying method of claim 2, wherein updating the training data comprises,
   in response to the user input includes one or more updates to the set of correlations, updating the training data regarding the defect group information.

4. The defect displaying method of claim 3 further comprising,
   incorporating the updated training data into a stored knowledge file; and
   displaying at least some of the plurality of defects according to their corresponding updated defect types in accordance with the updated training data.

5. The defect displaying method of claim 2 further comprising,
   in response to the user input includes one or more updates to the set of correlations, assigning an updated defect type to the defect in accordance with the one or more updates to the set of correlations.

6. The defect displaying method of claim 2, wherein the acquired user input is confirmation of the set of correlations between the plurality of defects and their corresponding defect types.

7. The defect displaying method of claim 1, wherein the acquired user input is an assignment of a second set of correlations between the plurality of defects and their corresponding defect types.

8. The defect displaying method of claim 1, wherein displaying at least some of the plurality of defects further comprises displaying a plurality groups of defects according to their corresponding assigned defect types in a plurality of lines.

9. The defect displaying method of claim 1, wherein the set of correlations comprises a first set of defects assigned to a first defect type, and a second set of defects assigned to a second defect type, and/or
   wherein displaying comprises distinguishing the first set of defects from the second set of defects in a visual manner.

10. A defect displaying method comprising,
    acquiring defect group information from an image of a wafer, wherein the defect group information includes a set of correlations between a plurality of defects identified from the image and one or more corresponding assigned defect types, and the defect group information being automatically generated based on training data;
    displaying at least some of the plurality of defects according to their corresponding assigned defect types;
    acquiring a user input regarding the defect group information between a defect among the displayed defects and its defect type; and
    updating the training data regarding the defect group information according to the user input,
    wherein the acquired defect group information is achieved by assigning a new defect type not in the training data of a knowledge file, the assigning comprising:
    comparing the defect with a tree algorithm of defect type in training data of a knowledge file;
    creating a new defect type in response to the comparing returning a confidence level of similarity less than a preset value; and
    assigning the defect to the new defect type.

11. The defect displaying method of claim 10, wherein comparing the defect with the tree algorithm of defect type in training data of the knowledge file further comprises:
    comparing the defect with categories of defect type at first level,
    comparing the defect with categories of defect type at second level, and
    determining the comparison of the second level having the confidence level of similarity less than a preset value, and
    wherein creating the new defect type further comprises creating the new defect type at the second level of the tree algorithm of defect type.

12. A defect data training method for assisting with distinguishing one or more defects on an image of a wafer, the method comprising,
    presenting a plurality of defects according to a stored set of defect correlation information between the plurality of defects identified from the image and corresponding defect types, the set of defect correlation information being automatically generated based on training data;
    receiving a user input of defect correlation information between a defect among the displayed defects and a corresponding defect type;
    comparing the input defect correlation information between the defect and the corresponding defect type with the stored set of defect correlation information between the plurality of defects and corresponding defect types; and
    updating, based on the comparison, the correlation information between the defect and the corresponding defect type in the stored set of defect correlation information.

13. The defect data training method of claim 12, wherein updating the correlation information between the defect and the corresponding defect type in the stored set of defect correlation information comprise:

replacing the stored defect correlation information between the defect and corresponding defect type with the input defect correlation information between the defect and corresponding defect type.

14. The defect data training method of claim 12, wherein updating the correlation information between the defect and the corresponding defect type in the stored set of defect correlation information comprise:

adding the input defect correlation information between the defect and corresponding defect type to the stored set of defect correlation information between a plurality of defects and corresponding defect types.

15. The defect data training method of claim 12, wherein updating the correlation information between the defect and the corresponding defect type in the stored set of defect correlation information comprise:

retaining the stored set of defect correlation information between a plurality of defects and corresponding defect types.

\* \* \* \* \*